(12) United States Patent
Ahn et al.

(10) Patent No.: US 10,739,824 B2
(45) Date of Patent: *Aug. 11, 2020

(54) ELECTRONIC DEVICE

(71) Applicant: Samsung Electronics Co., Ltd, Suwon-si (KR)

(72) Inventors: Seong-su Ahn, Uiwang-si (KR); Seog-geun Lee, Daegu (KR); Yong-sang Yun, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/154,606

(22) Filed: Oct. 8, 2018

(65) Prior Publication Data

US 2019/0041911 A1  Feb. 7, 2019

Related U.S. Application Data

(63) Continuation of application No. 14/973,481, filed on Dec. 17, 2015, now Pat. No. 10,126,781.

(30) Foreign Application Priority Data

Dec. 18, 2014  (KR) .................. 10-2014-0183301

(51) Int. Cl.
*G06F 1/16* (2006.01)
*H04M 1/02* (2006.01)

(52) U.S. Cl.
CPC .......... *G06F 1/1637* (2013.01); *G06F 1/1605* (2013.01); *G06F 1/1626* (2013.01); *G06F 1/1686* (2013.01); *H04M 1/0264* (2013.01)

(58) Field of Classification Search
CPC .... G06F 1/1605; G06F 1/1637; G06F 1/1684; G06F 1/1686; G06F 1/1688; G06F 1/169;
(Continued)

(56) References Cited

U.S. PATENT DOCUMENTS 8,243,424 B1 * 8/2012 Babu .................... G06F 1/1601
361/679.01
8,582,026 B2  11/2013 Ko et al.
(Continued)

FOREIGN PATENT DOCUMENTS

CN  101431563 A  5/2009
CN  102883033 A  1/2013
(Continued)

OTHER PUBLICATIONS

State Intellectual Property Office of China Notification of First Office Action regarding Application No. 201510930823.9, dated Mar. 16, 2018, 23 pages.
(Continued)

*Primary Examiner* — Nidhi Thaker

(57) ABSTRACT

An electronic device includes a display module including at least one first inserting portion; a printed circuit board electrically connected to the display module and including a second inserting portion that overlaps with at least some parts of the first inserting portion; and at least one function module, where at least some parts of the at least one function module are inserted into the first inserting portion and the second inserting portion.

17 Claims, 19 Drawing Sheets

(58) Field of Classification Search
CPC .... G06F 1/1694; G06F 1/1696; G06F 1/1698; G06F 1/1607; H04M 1/0264; H04N 5/2251; H04N 5/2252; H04N 5/2254
See application file for complete search history.

(56) References Cited

U.S. PATENT DOCUMENTS

| | | |
|---|---|---|
| 8,619,067 B2 | 12/2013 | Emmert et al. |
| 8,811,033 B2 | 8/2014 | Suetomi et al. |
| 8,836,587 B2 | 9/2014 | Darnell et al. |
| 9,192,072 B2* | 11/2015 | Shin .................. H05K 7/14 |
| 9,417,494 B2 | 8/2016 | Kim et al. |
| 9,880,690 B2 | 1/2018 | Oh |
| 2004/0021792 A1* | 2/2004 | Yasui ................ H04N 5/2253 348/373 |
| 2008/0019502 A1 | 1/2008 | Emmert et al. |
| 2009/0017867 A1* | 1/2009 | Koh .................. H04M 1/0264 455/556.1 |
| 2009/0122026 A1* | 5/2009 | Oh ...................... G06F 1/1613 345/174 |
| 2012/0098736 A1* | 4/2012 | Yee ..................... G06F 1/1626 345/76 |
| 2012/0170244 A1* | 7/2012 | Kwon ................. G06F 1/1637 361/829 |
| 2013/0016267 A1* | 1/2013 | Ko ..................... G06F 1/1637 348/333.01 |
| 2013/0308282 A1 | 11/2013 | Shin et al. |
| 2013/0328051 A1* | 12/2013 | Franklin ............. H01L 29/786 257/59 |
| 2014/0078708 A1* | 3/2014 | Song .................. H04M 1/0264 361/809 |
| 2014/0160348 A1 | 6/2014 | Wang et al. |
| 2014/0218629 A1* | 8/2014 | Chuang ............... G06F 3/0416 349/12 |
| 2014/0225131 A1 | 8/2014 | Benson |
| 2014/0253799 A1 | 9/2014 | Moon et al. |
| 2015/0380825 A1 | 12/2015 | Ryu et al. |

FOREIGN PATENT DOCUMENTS

| | | |
|---|---|---|
| CN | 103176303 A | 6/2013 |
| CN | 203589190 U | 5/2014 |
| EP | 2485132 A1 | 8/2012 |
| EP | 2778832 A2 | 9/2014 |
| EP | 2779597 A2 | 9/2014 |
| KR | 10-2012-0100285 A | 9/2012 |
| KR | 10-2013-0008170 A | 1/2013 |
| KR | 10-2013-0027335 A | 3/2013 |
| KR | 10-2014-0074210 A | 6/2014 |
| TW | 201403170 A | 1/2014 |
| WO | 2014/142411 A1 | 9/2014 |

OTHER PUBLICATIONS

Office Action dated Jun. 21, 2018 in connection with European Patent Application No. 15 199 960.4.
Office Action dated Sep. 12, 2017 in connection with Korean Patent Application No. 10-2014-0183301.
International Search Report and Written Opinion of the International Searching Authority dated Mar. 10, 2016 in connection with International Patent Application No. PCT/KR2015/013126, 11 pages.
Extended European Search Report dated Apr. 26, 2016 in connection with European Application No. 15199960.4, 5 pages.
Office Action dated Nov. 12, 2019 in connection with Chinese Patent Application No. 201810312585.9, 12 pages.
Office Action dated Oct. 30, 2019 in connection with Vietnam Patent Application No. 1-2017-01422, 4 pages.
Office Action dated Apr. 21, 2020 in connection with Chinese Patent Application No. 201910096073.8, 8 pages.

* cited by examiner

ELECTRONIC DEVICE

CROSS-REFERENCE TO RELATED APPLICATIONS

This application is a continuation of U.S. patent application Ser. No. 14/973,481 filed Dec. 17, 2015, which is based on and claims priority under 35 U.S.C. § 119 to Korean Patent Application No. 10-2014-0183301 filed on Dec. 18, 2014 in the Korean Intellectual Property Office, the disclosures of which are herein incorporated by reference in their entirety.

BACKGROUND

1. Field

The present disclosure relates to methods an electronic device including a display module.

2. Description of Related Art

An electronic device such as a smartphone, a tablet PC, a notebook PC, and PDA includes a display module for providing an image or a video to a user.

Such electronic device may include various functions as well as a display function, for example, a photographing function, a user recognition function, or the like. To this end, an electronic device may include a sensor module, which is a function module different from the display module.

SUMMARY

When an electronic device includes a display module and other function modules, a size and a thickness of the electronic device may increase due to a size and a thickness of each module.

To address the above-discussed deficiencies, it is a primary object to provide, for use in an electronic device that may decrease a size and a thickness thereof when the electronic device includes a display module and other function modules.

Additional aspects will be set forth in part in the description that follows and, in part, will be apparent from the description, or may be learned by practice of the presented exemplary embodiments.

According to an aspect of an exemplary embodiment, an electronic device includes a display module including at least one first inserting portion; a printed circuit board electrically connected to the display module and including a second inserting portion that overlaps with at least some parts of the first inserting portion; and at least one function module, wherein at least some parts of the at least one function module are inserted into the first inserting portion and the second inserting portion.

In some embodiments, the electronic device further includes a frame having a third inserting portion that overlaps with at least some parts of the first inserting portion, wherein at least some parts of the at least one function module are inserted into the first inserting portion, the second inserting portion and the third inserting portion.

In some embodiments, the electronic device further includes a flexible printed circuit connecting the display module and the printed circuit board, and including a fourth inserting portion that overlaps with at least some parts of the first inserting portion, wherein at least some parts of the at least one function module are inserted into the first inserting portion, the second inserting portion and the fourth inserting portion.

According to an aspect of another exemplary embodiment, an electronic device includes a display module including at least one first inserting portion; a frame including a third inserting portion that overlaps with at least some parts of the first inserting portion; and at least one function module, wherein at least some parts of the at least one function module are inserted into the first inserting portion and the third inserting portion.

According to an aspect of another exemplary embodiment, an electronic device includes a printed circuit board; a display module including at least one first inserting portion; a flexible printed circuit connecting the display module and the printed circuit board, and including a fourth inserting portion that overlaps with at least some parts of the first inserting portion; and at least one function module, wherein at least some parts of the at least one function module are inserted into the first inserting portion and the fourth inserting portion.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
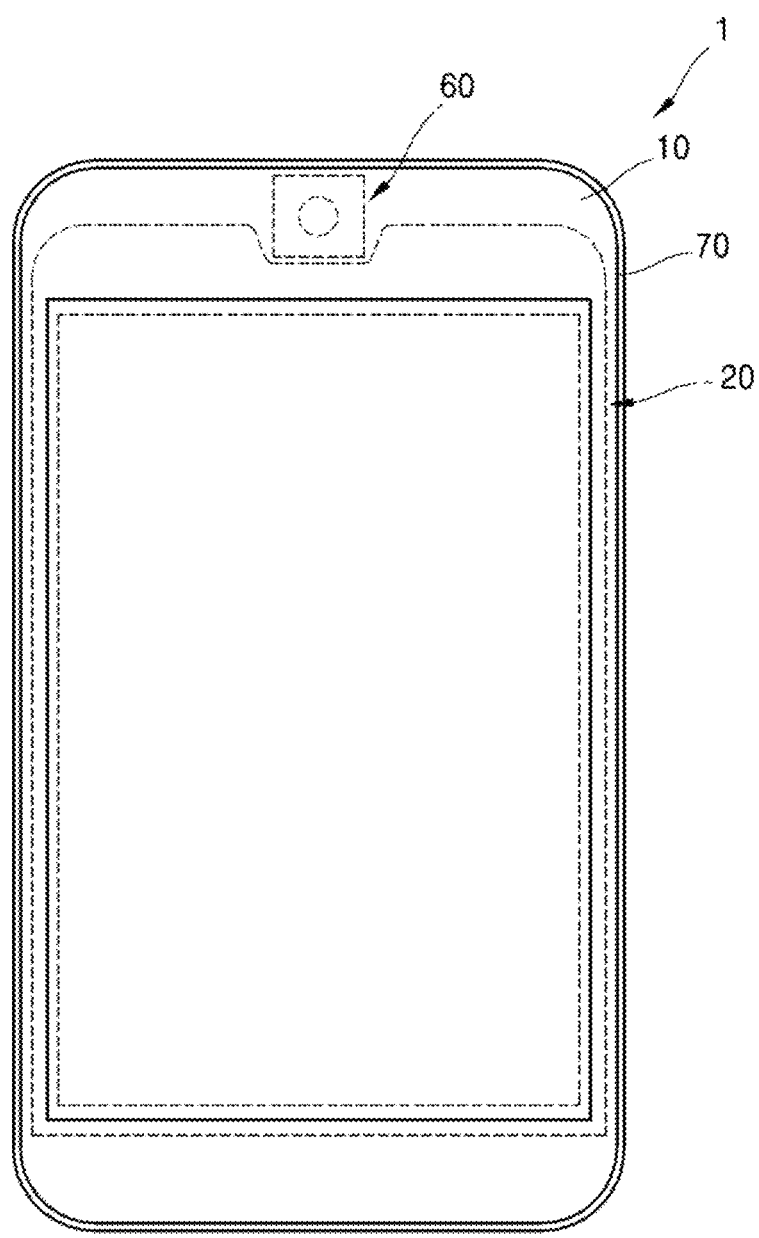
FIG. 1 illustrates a front view of an electronic device according to various embodiments of the present disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. Reference will now be made in detail to exemplary embodiments, examples of which are illustrated in the accompanying drawings. Also, an electronic device according to exemplary embodiments will be described in detail with reference to the accompanying drawings. Like reference numerals in the drawings denote like elements.

While such terms as "first," "second," etc., may be used to describe various components, such components must not be limited to the above terms. The above terms are used only to distinguish one component from another. For example, a first element could be termed a second element, and, similarly, a second element could be termed a first element, without departing from the scope of exemplary embodiments. As used herein, the term "and/or", includes any and all combinations of one or more of the associated listed items.

The terms used in the present specification are merely used to describe particular embodiments, and are not intended to limit the inventive concept. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. Like reference numerals in the drawings denote like elements.

Figure 2A:
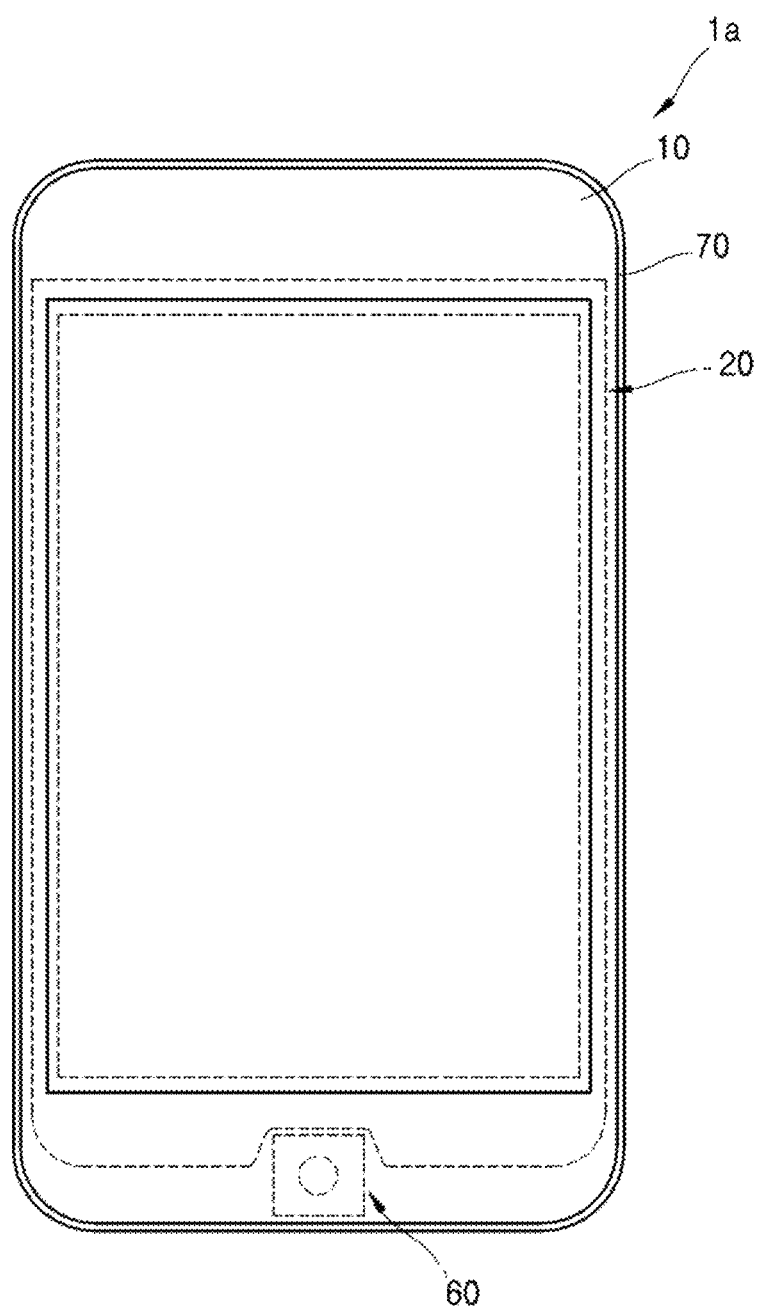
FIGS. 2A and 2B illustrate a front view and a rear view of an electronic device according to various embodiments of the present disclosure.
Figure 2B:
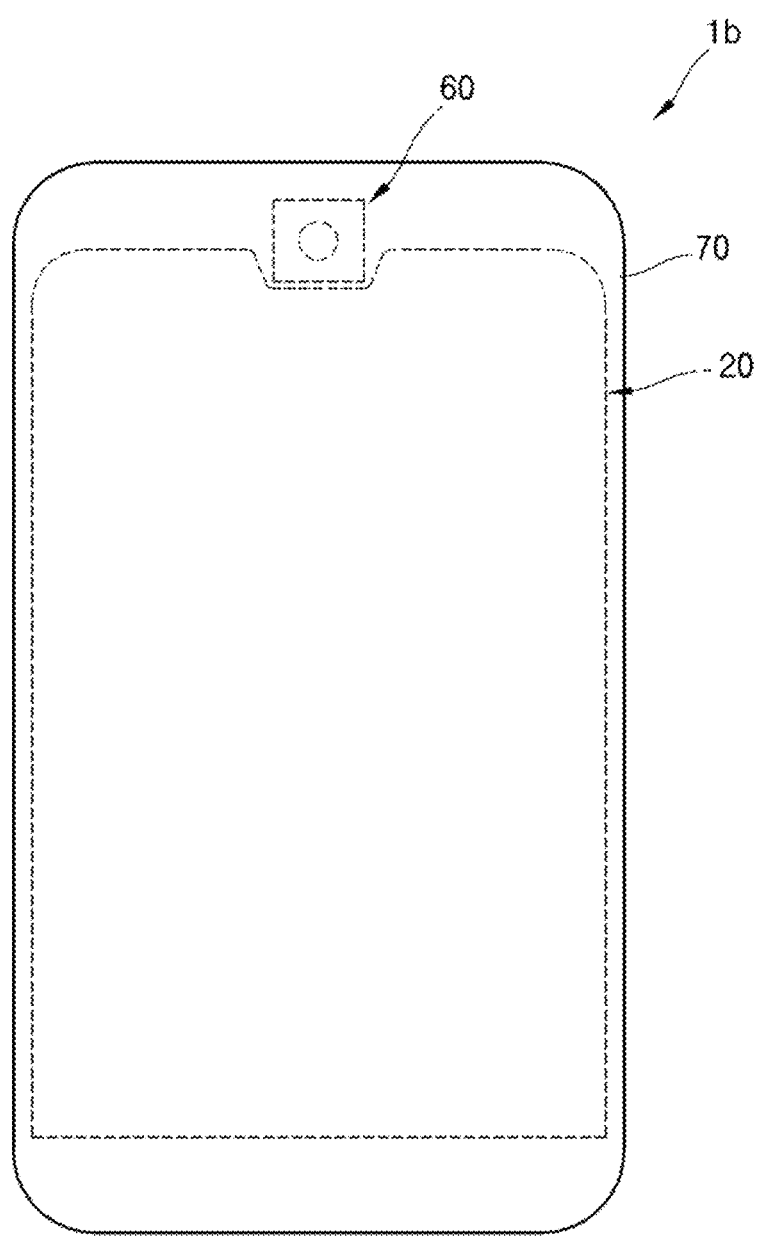

FIG. 1 illustrates a front view of an electronic device 1 according to an exemplary embodiment of the inventive concept. FIGS. 2A and 2B illustrate a front view and a rear view of electronic devices 1a and 1b according to another exemplary embodiment. FIGS. 1, 2A and 2B show a smartphone as an example of the electronic devices 1, 1a, and 1b, but an electronic device including a display module 20 such as a tablet PC, a notebook PC, and PDA may be used as an example.

Referring to FIG. 1, the electronic device 1 according to an exemplary embodiment may include the display module 20, at least one function module 60 and a housing 70.

The display module 20 and the function module 60 may be accommodated in the housing 70. The housing 70 may consist of a single member or a plurality of members that may be assembled. The housing 70 may include at least one of a plastic material, a ceramic material and a metal material.

The display module 20 may display an image or a video. The display module 20 may include a front surface displaying an image or a video, and a rear surface disposed at the opposite side of the front surface.

The function module 60 may be a module performing, not a display function, but the other function. For example, the function module 60 may be a sensor module for detecting or receiving a signal from outside. Examples of the sensor module may include a camera module, a fingerprint sensor, a proximity sensor, and an infrared sensor. In some embodiments, the function module 60 may be an output module for outputting a signal to outside, for example, a receiver.

According to an embodiment, the function module 60 may be disposed on an upper part of the electronic device 1 to face a front. In some embodiments, the function module 60 may be disposed on a lower part of the electronic device 1a to face a front as shown in FIG. 2A. In some embodiments, the function module 60 may be disposed on an upper part of the electronic device 1b to face a rear as shown in FIG. 2B.

According to an embodiment, at least some parts of the function module 60 may be inserted into the display module 20 and a member disposed on a rear side of the display module 20 so that, though including the function module 60, an increases in a size or a thickness of the electronic device 1 may be minimized or reduced. Here, the front refers to a direction in which an image or a video is displayed in the display module 20, and the rear refers to a direction opposite to the front.

When the function module 60 is disposed at an edge of the display module 20, for example, an upper part or a lower part thereof, a size of the electronic device 1 may increase due to the function module 60. In addition, when the function module 60 is disposed on the rear side of the display module 20, a thickness of the electronic device 1 may increase due to the function module 60. Such increases in the size and the thickness of the electronic device 1 may degrade a competitiveness of the electronic device 1.

In the electronic device 1 according to an embodiment, at least some parts of the function module 60 may be inserted into the display module 20 and a member disposed on the rear side of the display module 20, and thus, increases in a size and a thickness of the electronic device 1 may be minimized.

Figure 3:
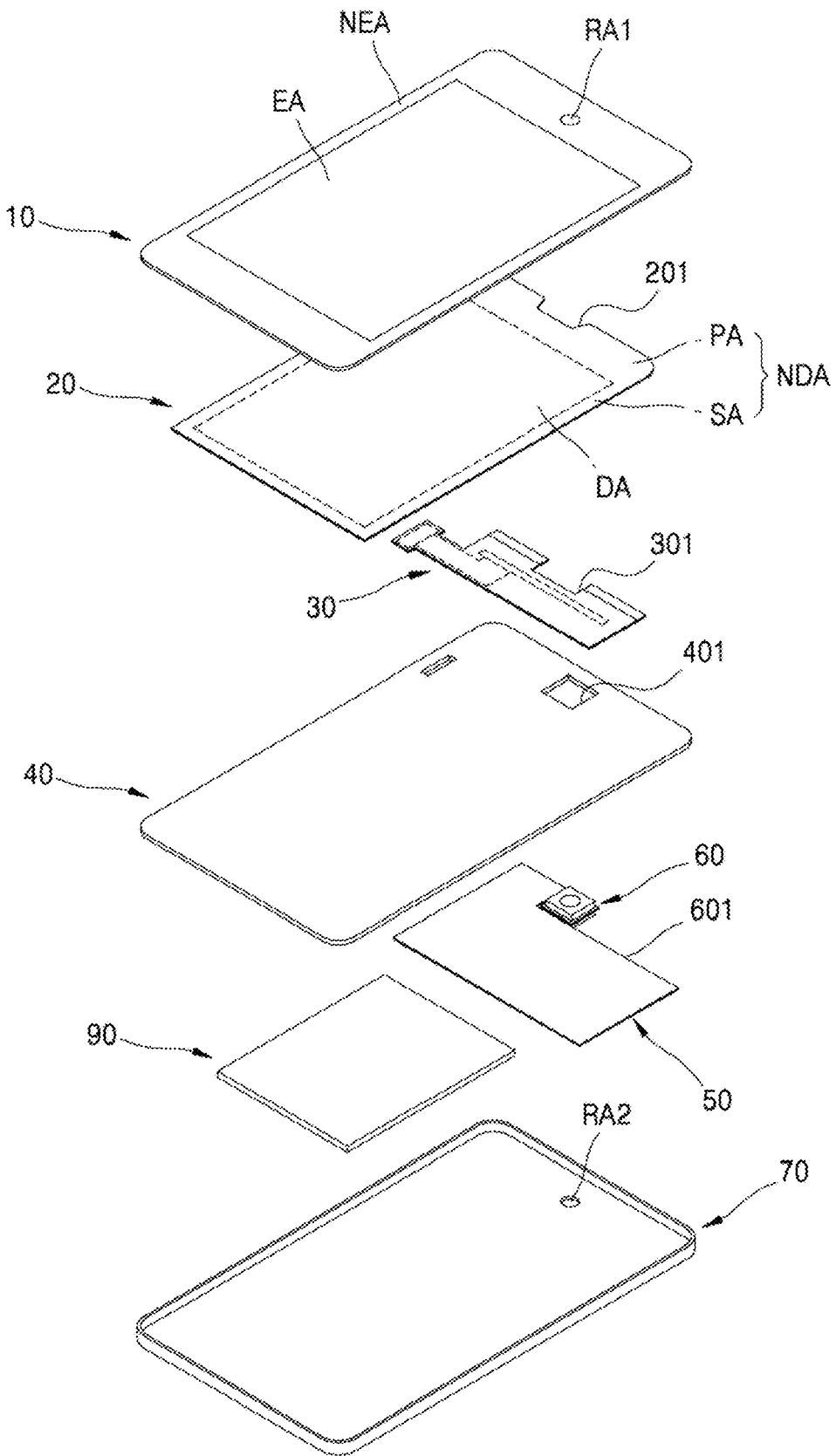
FIG. 3 illustrates an exploded perspective view of the electronic device according to various embodiments of the present disclosure.

FIG. 3 illustrates an exploded perspective view of the electronic device 1.

Referring to FIG. 3, the electronic device 1 may include a window 10, the display module 20, a frame 40, a printed circuit board 50, and the housing 70. The electronic device 1 may further include a battery 90. The display module 20 may be electrically connected to and the printed circuit board 50 via a flexible printed circuit 30.

The window 10 may be disposed in front of the display module 20. The window 10 may protect a front surface of the display module 20 and expose an image or a video displayed in the display module 20 to outside.

The window 10 may have an exposed area EA exposing an image or a video of the display module 20, and a non-exposed area NEA blocking a visibility from outside. The non-exposed area NEA may include a light-shielding layer, for example, a black mattress so that the inside of the electronic device 1 may not be seen.

The non-exposed area NEA may include a receiving area RA1 for transmitting a signal from outside to the function module 60. Visible ray or infrared ray may move from outside to the function module 60 via the receiving area RA1. Also, a signal generated in the function module 60 may be transmitted to outside via the receiving area RA1. However, a signal transmitted via the receiving area RA1 is not limited thereto, and may vary depending on the function module 60, for example, a type of a sensor module.

The display module 20 may include a display area DA for displaying an image and a non-display area NDA for not displaying an image. The non-display area NDA may be disposed on the outside of the display area DA.

The non-display area NDA may include a sealing area SA and a pad area PA. The sealing area SA may seal the inside of the display module 20, and the pad area PA may transmit and/or receive a signal to and/or from outside. The non-exposed area NEA of the window 10 may be disposed in front of the non-display area NDA of the display module 20, and prevent the non-display area NDA of the display module 20 from being seen from outside.

The display module 20 may include a first inserting portion 201 into which at least some parts of the function module 60 may be inserted. The first inserting portion 201 may be formed in a hole shape, but embodiments are not limited thereto. The first inserting portion 201 may be formed in a groove shape.

The first inserting portion 201 may be formed in the non-display area NDA of the display module 20. For example, the first inserting portion 201 may be formed in the pad area PA of the non-display area NDA.

A position of the first inserting portion 201 may vary depending on a position of the function module 60. For example, when the function module 60 is positioned in the middle of the pad area PA, the first inserting portion 201 may be formed in the middle of the pad area PA. Although not illustrated, in some embodiments, when the function module 60 may be not positioned on the middle of the pad area PA, for example, the function module 60 may be positioned on a right side or a left side of the pad area PA, the first inserting portion 201 may be formed on a right side or a left side of the pad area PA.

Figure 4A:
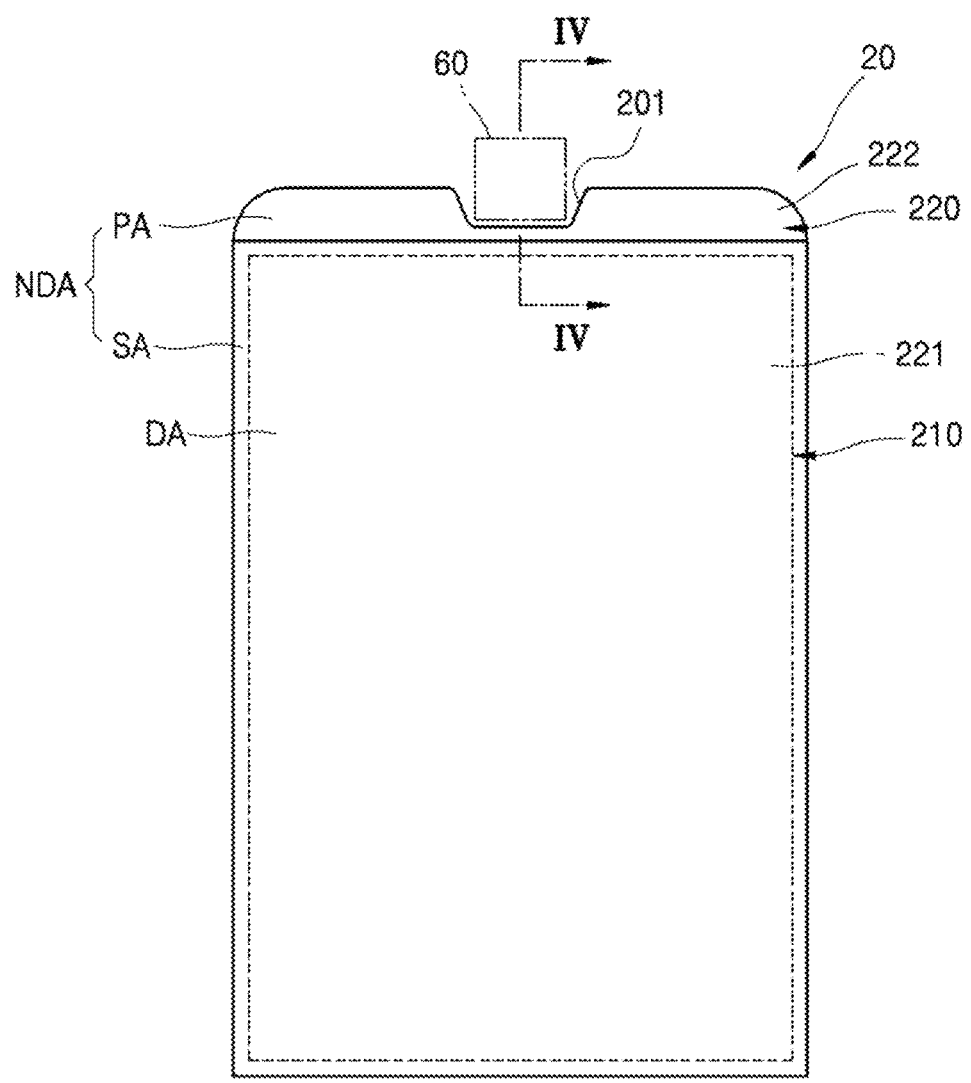
FIG. 4A illustrates a front view of the display module according to various embodiments of the present disclosure.
Figure 4B:
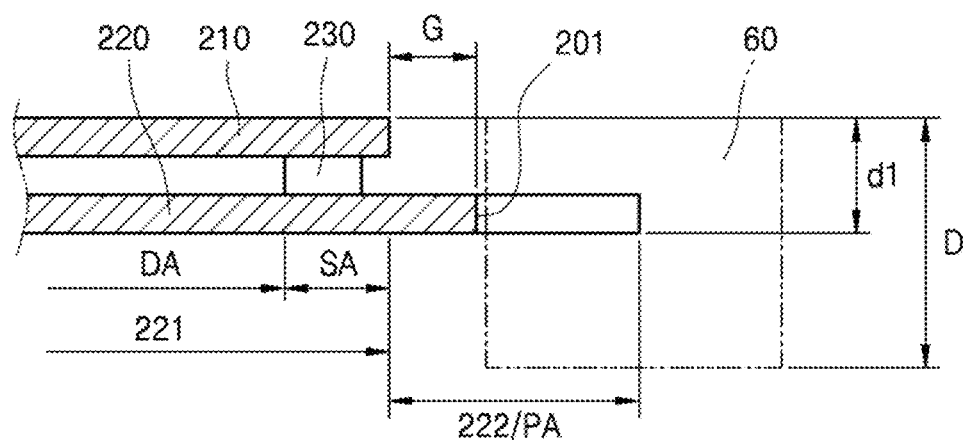
FIG. 4B illustrates a sectional view of some parts of the display module according to various embodiments of the present disclosure.

FIG. 4A illustrates a front view of the display module 20, and FIG. 4B illustrates a sectional view of some parts of the display module 20. For example, FIG. 4B illustrates a sectional view of FIG. 4A, taken along a line IV-IV.

Referring to FIGS. 4A and 4B, the display module 20 may include a plurality of layers, for example, an upper plate 210 and a lower plate 220. The upper plate 210 may include a color filter, and the lower plate 220 may include a thin film transistor and circuit wires 22 and 23 (see FIG. 5) connected to the thin film transistor. A liquid crystal material layer may be disposed between the upper plate 210 and the lower plate 220. However, components of the plurality of layers of the display module 20 are not limited thereto, and the components may vary depending on a type of the display module 20. For example, when the display module 20 is an organic light-emitting display device, a liquid crystal material layer disposed between the upper plate 210 and the lower plate 220 may be omitted, or an organic/inorganic material layer may be formed therebetween.

The lower plate 220 may include an overlapped area 221 that overlaps with the upper plate 210 and a non-overlapped area 222 that does not overlap with the upper plate 210. A plurality of thin film transistors may be disposed in the overlapped area 221, and the circuit wires 22 and 23 (see FIG. 5) may be disposed in the non-overlapped area 222.

The overlapped area 221 may be disposed in the display area DA and the sealing area SA, and the non-overlapped area 222 may be disposed in the pad area PA. The sealing area SA may include a sealing member 230, and the upper plate 210 and the lower plate 220 may be bonded together and sealed by the sealing member 230. The flexible printed circuit 30 may be connected to the pad area PA, and the display module 20 may receive and/or transmit a signal from and/or to the printed circuit board 50 via the flexible printed circuit 30.

The first inserting portion 201 may be formed in the lower plate 220 of the display module 20. At least some parts of the function module 60 may be inserted into the first inserting portion 201. For example, some parts of the function module 60, in terms of a size may be inserted into the first inserting portion 201 and some parts of the function module 60, in terms of a thickness may be inserted into the first inserting portion 201.

At least some parts of the function module 60 are inserted into the first inserting portion 201 of the display module 20, and thus, a thickness of the function module 60 and the display module 20 when coupled in the electronic device 1 may be less than a sum of thicknesses D and d1, which are respectively thicknesses of the function module 6 and the display module 20. In addition, a size (or area) of the function module 60 and the display module 20 when coupled in the electronic device 1 may also be smaller than a sum of sizes of the function module 60 and the display module 20.

For example, as illustrated in FIG. 4B, when the thickness D of the function module 60 is greater than the thickness d1 of the display module 20, and the function module 60 is inserted into the first inserting portion 201 by the thickness d1 of the display module 20, the thickness of the function module 60 and the display module 20 when coupled in the electronic device 1 may be the same as the thickness D of the function module 60. In other words, the thickness d1 by which the function module 60 overlaps with the display module 20 via the first inserting portion 201 may not affect an increase in a thickness of the electronic device 1. Here, the upper plate 210 of the display module 20 is smaller than the lower plate 220, and thus, the function module 60 may overlap with the display module 20 without having an additional inserting portion in the upper plate 210. In this regard, the thickness d1 by which the function module 60 overlaps with the display module 20 via the first inserting portion 201 may be greater than a thickness of the first inserting portion 201.

Figure 5:
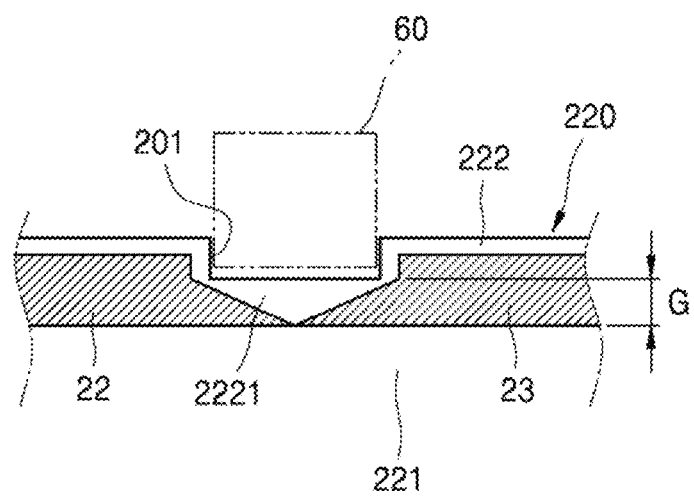
FIG. 5 illustrates a view magnifying some parts of the display module according to various embodiments of the present disclosure.

FIG. 5 illustrates a view magnifying some parts of the display module 20. Referring to FIGS. 4A, 4B and 5, the first inserting portion 201 may be formed in the non-overlapped area 222 of the lower plate 220 of the display module 20. The first inserting portion 201 may be spaced apart from the overlapped area 221 to have a predetermined gap G. Thus, the non-overlapped area 222 may include an area 2221 between the overlapped area 221 and the first inserting portion 201, and circuit wires 22 and 23 may be disposed in the area 2221. In this regard, the circuit wires 22 and 23 may be easily connected to an area adjacent to the first inserting portion 201 in the overlapped area 221.

The gap G between the first inserting portion 201 and the overlapped area 221 may vary depending on a resolution of the display module 20. For example, when a resolution is high, the gap G may be formed to be large, and when a resolution is low, the gap G may be formed to be small.

A planar shape of the first inserting portion 201 may be a polygonal shape, for example, a quadrangle. Here, the planar shape refers to a shape in a vertical direction to the front.

Figure 6A:
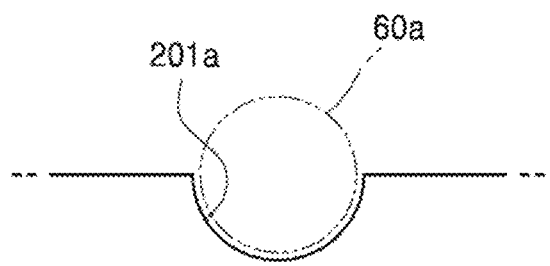
FIGS. 6A, 6B and 6C illustrate schematic views of examples of a first inserting portion of a display module according to various embodiments of the present disclosure.
Figure 6B:
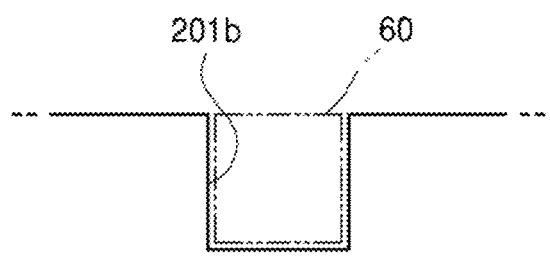
Figure 6C:
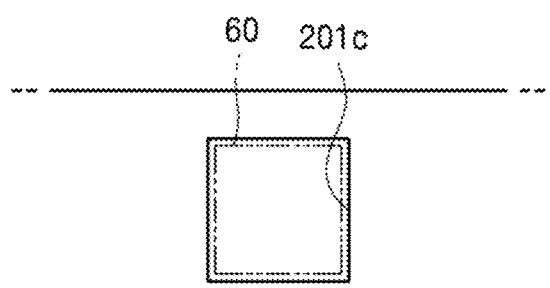

The planar shape of the first inserting portion 201 may vary depending on a shape of the function module 60 inserted into the first inserting portion 201, a ratio in which the function module 60 is inserted into the first inserting portion 201, and the like. In some embodiments, as illustrated in FIG. 6A, when a planar shape of a function module 60a is a circle, and a half of the function module 60a is inserted into a first inserting portion 201a, a planar shape of the first inserting portion 201a may be a semicircular shape, which is a half of the planar shape of the function module 60. In some embodiments, as illustrated in FIG. 6B, when a planar shape of the function module 60 is a square, and a whole part of the function module 60 is inserted into a first inserting portion 201b, a planar shape of the first inserting portion 201b may be a square corresponding to the planar shape of the function module 60. A position of a first inserting portion 201c may not be limited to an outer edge, and the first inserting portion 201c may be disposed at an inner side as illustrated in FIG. 6C.

Figure 7A:
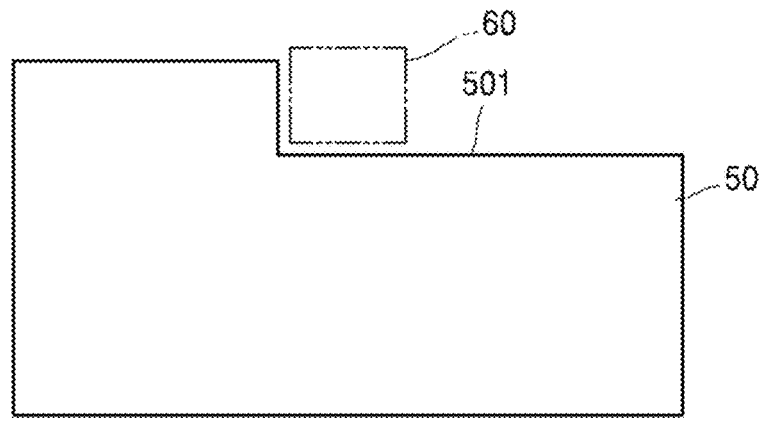
FIG. 7A illustrates a front view of a printed circuit board according to various embodiments of the present disclosure.

The first inserting portion 201 may be formed in various methods. In some embodiments, the first inserting portion 201 may be formed by cutting with a blade. In some embodiments, the first inserting portion 201 may be formed by cutting with laser. FIG. 7A illustrates a front view of the printed circuit board 50, and FIGS. 7B and 7C respectively illustrate a front view and a cross-sectional view of the display module 20 and the printed circuit board 50 for describing a disposition thereof.

Figure 7B:
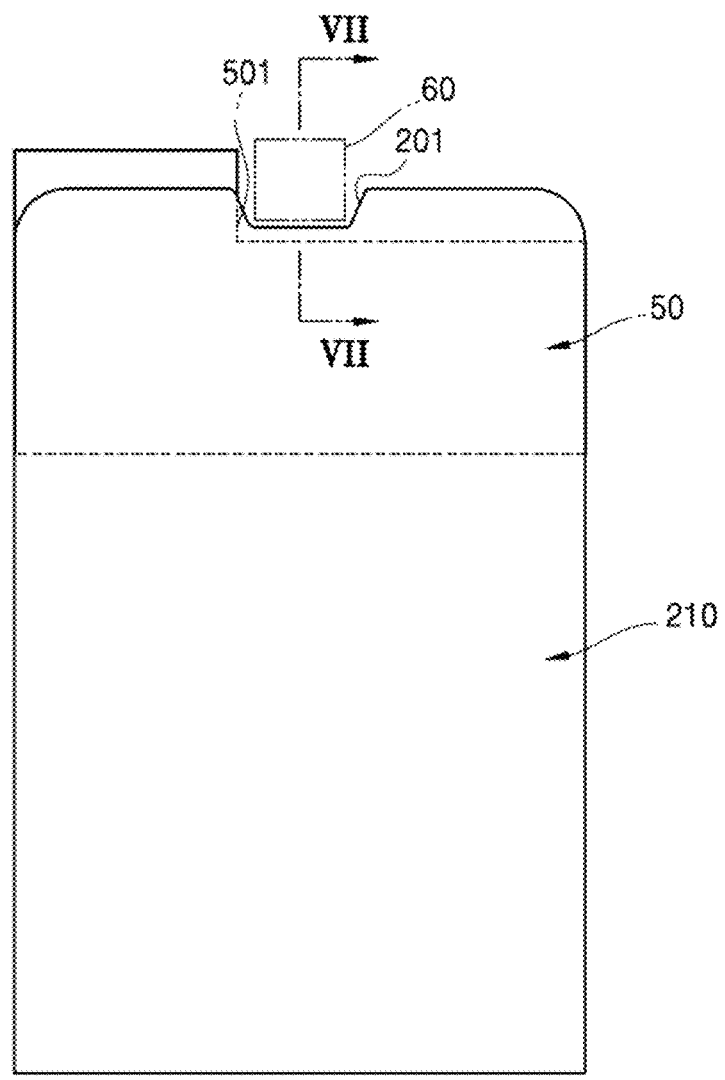
FIGS. 7B and 7C respectively illustrate a front view and a cross-sectional view of a display module and a printed circuit board for describing a disposition thereof according to various embodiments of the present disclosure.
Figure 7C:
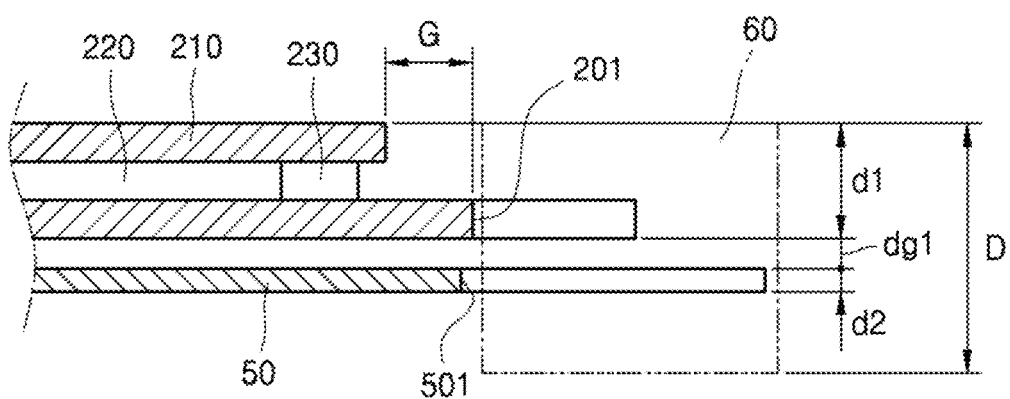

Referring to FIGS. 7A to 7C, the printed circuit board 50 may include at least some of components for controlling the display module 20. For example, the printed circuit board 50 may include at least one of a microprocessor, a microcontroller, an application specific integrated circuit (ASIC), and a general-purpose peripheral interface. The printed circuit board 50 may be disposed at the rear side of the display module 20.

The printed circuit board 50 may include a second inserting portion 501 into which a part of the thickness D of the function module 60 may be inserted. The second inserting portion 501 may be formed in a hole shape, but is not limited thereto. The second inserting portion 501 may also be formed in a groove shape. As an example of the second inserting portion 501 having a groove shape, the second inserting portion 501 may be formed in a socket type, which is a shape into which some parts of the function module 60 may be inserted.

At least some parts of the second inserting portion 501 may overlap with the first inserting portion 201. At least some parts of the function module 60 may be inserted into the first inserting portion 201 and the second inserting portion 501. In this regard, a thickness by which the function module 60 is inserted into the first inserting portion 201 and the second inserting portion 501 out of a whole thickness of the function module 60 may not affect an increase in the thickness of the electronic device 1.

For example, out of the whole thickness D of the function module 60, a thickness d1 by which the function module 60 overlaps with the display module 20 and a thickness d2 by which the function module 60 overlaps with the printed circuit board 50 may not affect an increase in a thickness of the electronic device 1. Also, when there is a gap between the display module 20 and the printed circuit board 50, a thickness dg1 corresponding to the gap out of the whole thickness D of the function module 60 may not affect an increase in a thickness of the electronic device 1.

Figure 8A:
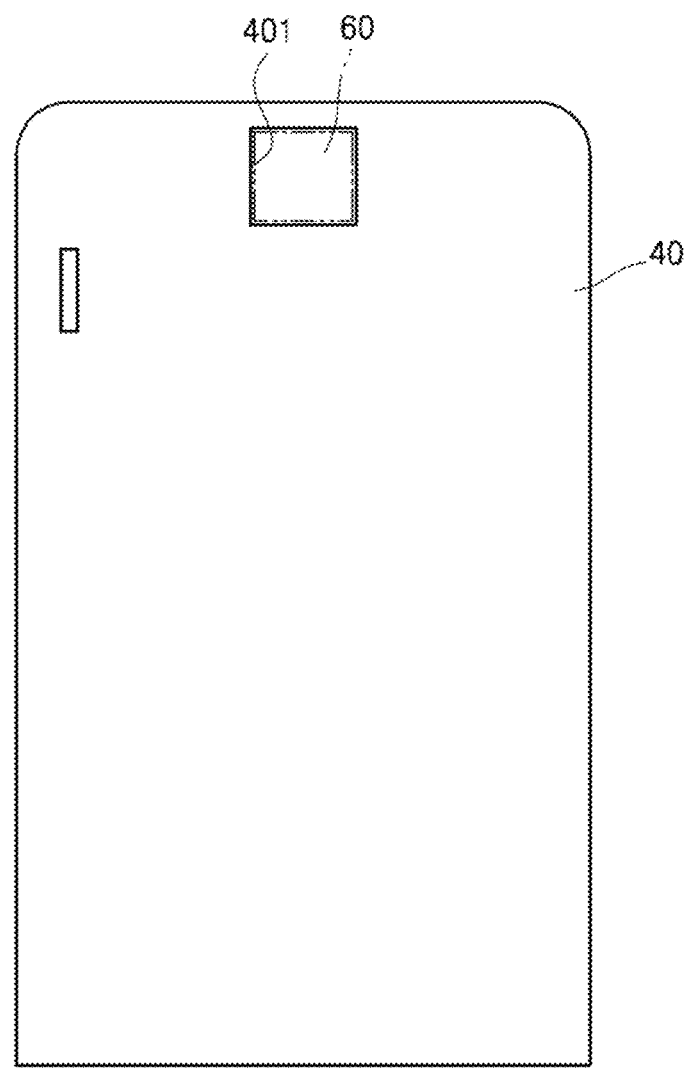
FIG. 8A illustrates a front view of a frame according to various embodiments of the present disclosure.
Figure 8B:
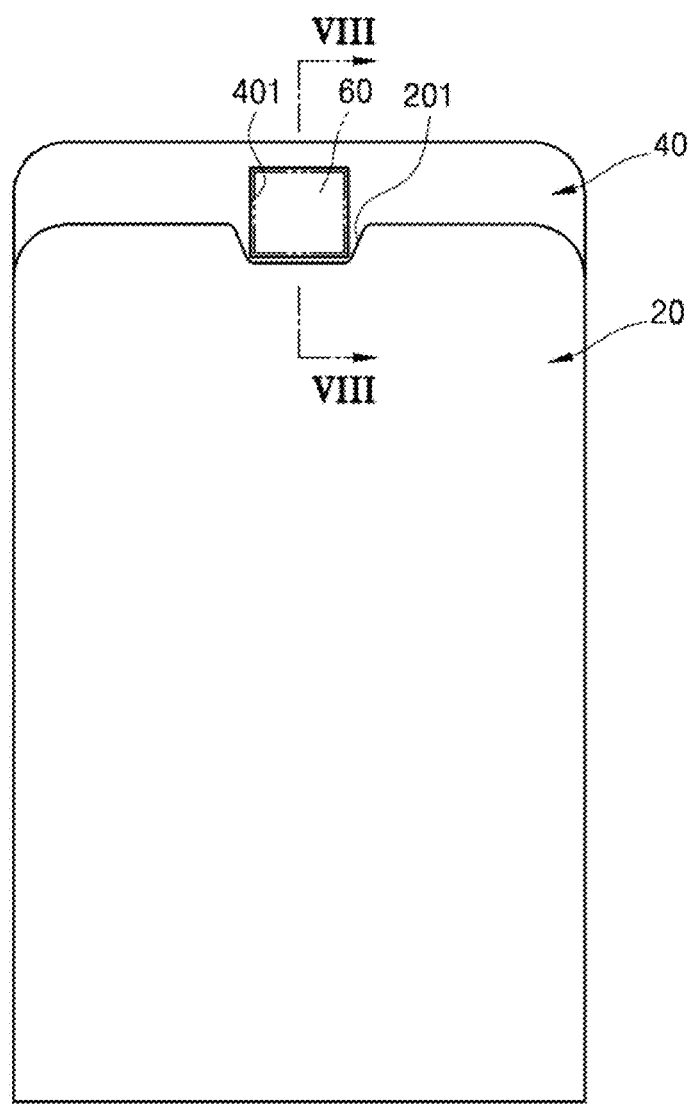
FIGS. 8B and 8C respectively illustrate a front view and a cross-sectional view for describing a disposition of a display module and a frame according to various embodiments of the present disclosure.
Figure 8C:
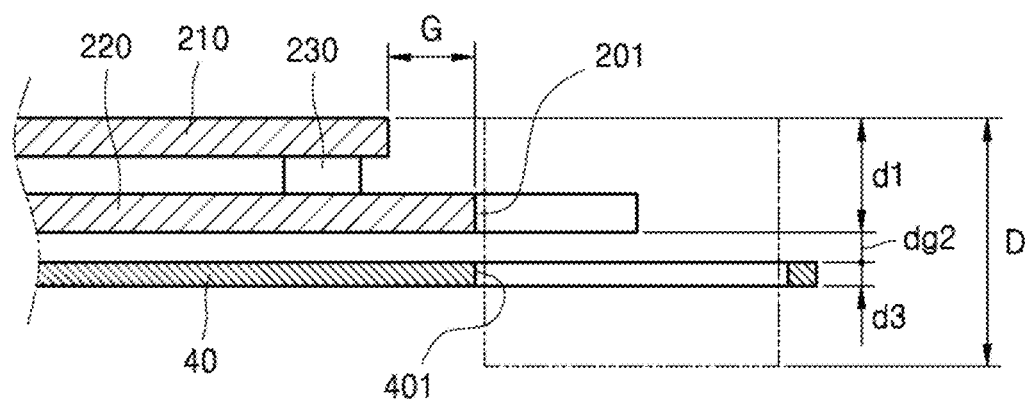

FIG. 8A illustrates a front view of the frame 40, and FIGS. 8B and 8C respectively illustrate a front view and a cross-sectional view for describing a disposition of the display module 20 and the frame 40.

Referring to FIGS. 8A to 8C, the frame 40 may include a third inserting portion 401 into which a part of the thickness D of the function module 60 may be inserted. The third inserting portion 401 may be formed in a hole shape, but is not limited thereto. The third inserting portion 401 may also be formed in a groove shape.

At least some parts of the third inserting portion 401 may overlap with the first inserting portion 201. At least some parts of the function module 60 may be inserted into the first inserting portion 201 and the third inserting portion 401. In this regard, out of the whole thickness D of the function module 60, a sum of thicknesses d1 and d3 by which the function module 60 is inserted into the first inserting portion 201 and the third inserting portion 401 may not affect an increase in a thickness of the electronic device 1.

For example, out of the whole thickness D of the function module 60, the thickness d1 by which the function module 60 overlaps with the display module 20 and the thickness d3 by which the function module 60 overlaps with the frame 40 may not affect an increase in a thickness of the electronic device 1. Also, there is a gap between the display module 20 and the frame 40, a thickness dg2 corresponding to the gap out of the whole thickness D of the function module 60 may not affect an increase in a thickness of the electronic device 1.

The frame 40 may be fixed to the housing 70 (see FIG. 3). Some parts of the function module 60 are inserted into the third inserting portion 401 of the frame 40 so that the function module 60 may be fixed to the inside of the housing 70 via the frame 40.

Figure 9A:
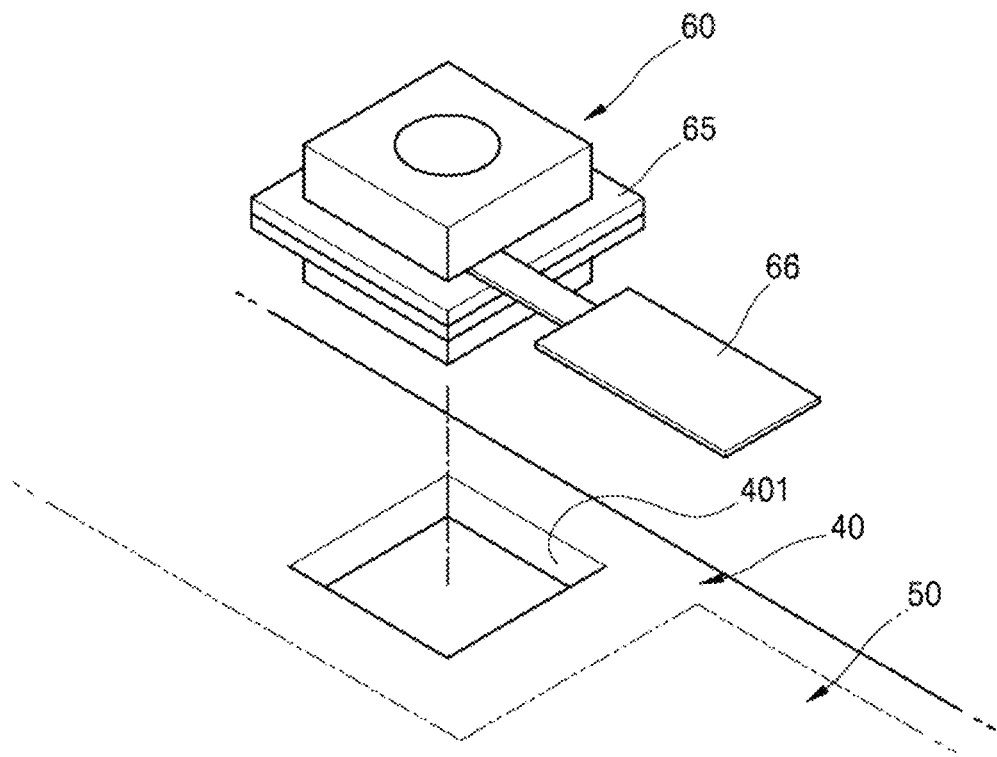
FIGS. 9A and 9B illustrate views for describing a case in which some parts of a function module are inserted into a third inserting portion of a frame according to various embodiments of the present disclosure.
Figure 9B:
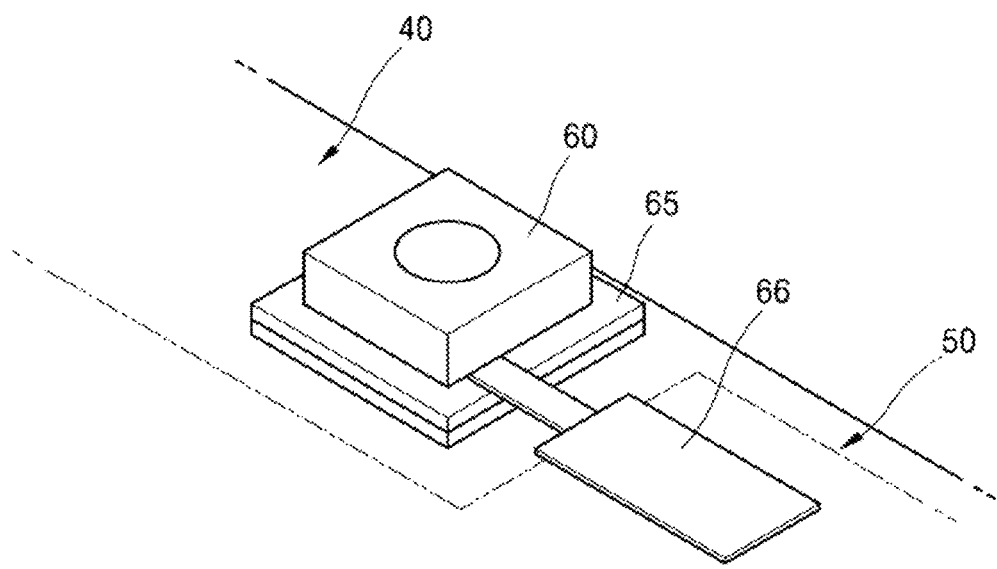

FIGS. 9A and 9B illustrate views for describing a case in which some parts of the function module 60 are inserted into the third inserting portion 401 of the frame 40. Referring to FIGS. 9A and 9B, the frame 40 may include the third inserting portion 401 having a shape that corresponds to a shape of the function module 60. A thickness of the third inserting portion 401 is less than a thickness of the function module 60.

A stopper 65 may be disposed at an outer edge of the function module 60, and the function module 60 may include a connector 66 to be connected to the printed circuit board 50.

When some parts of the function module 60 are inserted into the third inserting portion 401, the stopper 65 may prevent the function module 60 from being inserted into the third inserting portion 401 by more than a predetermined thickness. The function module 60 may be fixed to the frame 40 by adhesion or bolt-coupling. As a result, the function module 60 may be prevented from being moved up and down, right and left, and the front to rear side.

The function module 60 may be inserted into the third inserting portion 401 from the rear side of the frame 40, but embodiments are not limited thereto. The function module 60 may also be inserted to the third inserting portion 401 from the front of the frame 40.

Figure 10A:
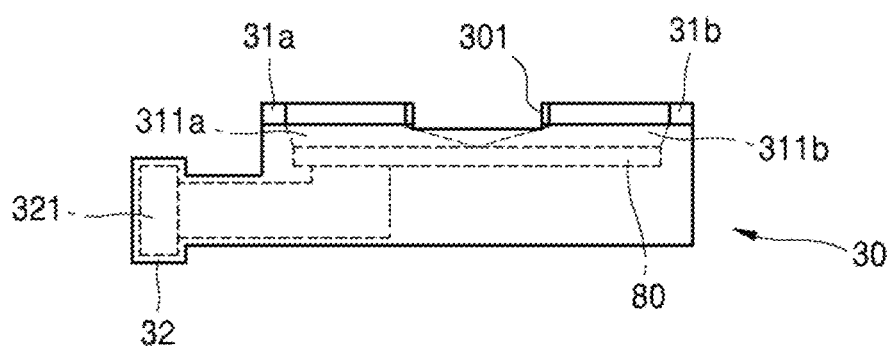
FIG. 10A illustrates a front view of an example of a flexible printed circuit according to various embodiments of the present disclosure.
Figure 10B:
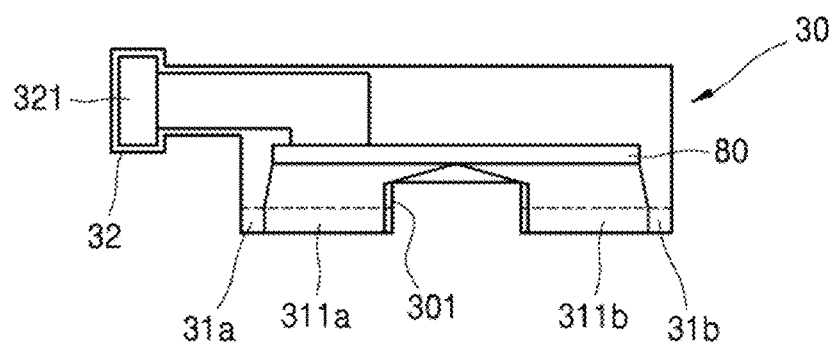
FIG. 10B illustrates a development view of the flexible printed circuit according to various embodiments of the present disclosure.
Figure 11A:
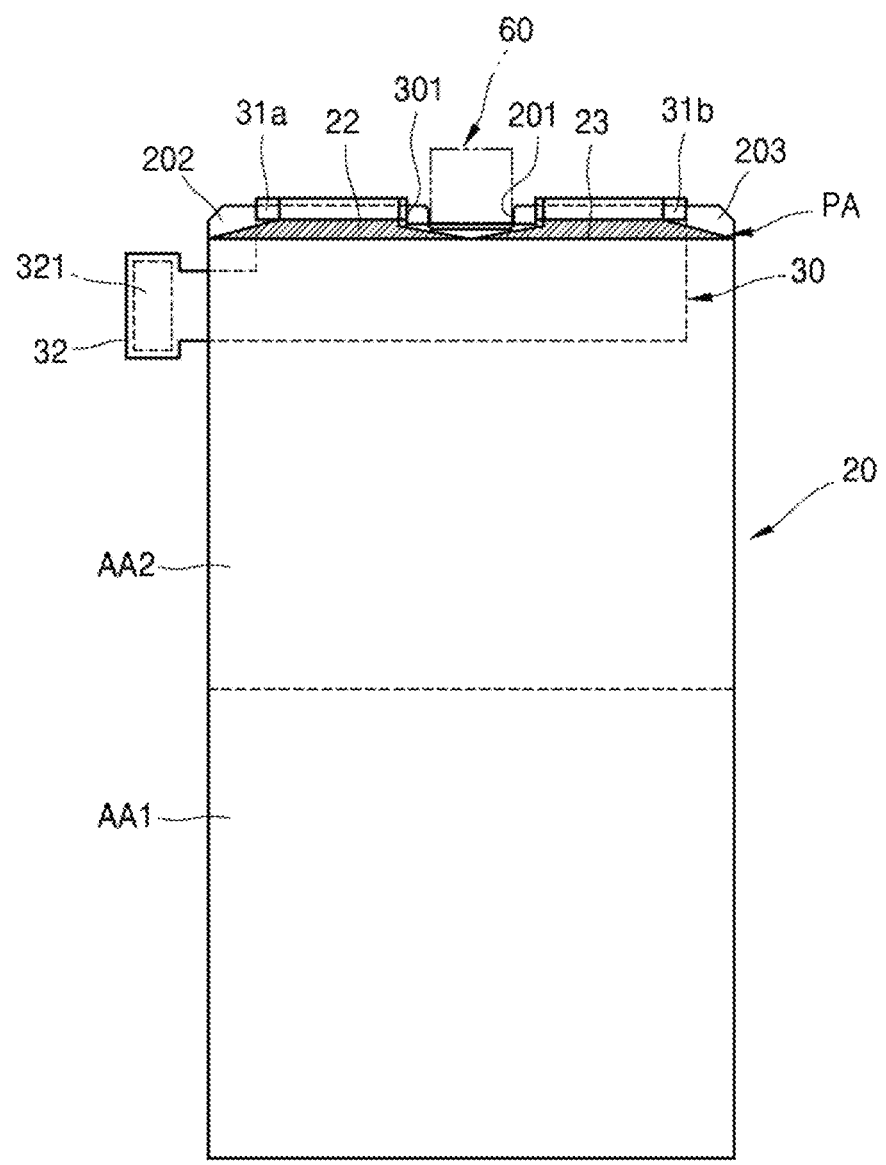
FIGS. 11A and 11B illustrate a case in which a flexible printed circuit is connected to a display module according to various embodiments of the present disclosure.
Figure 11B:
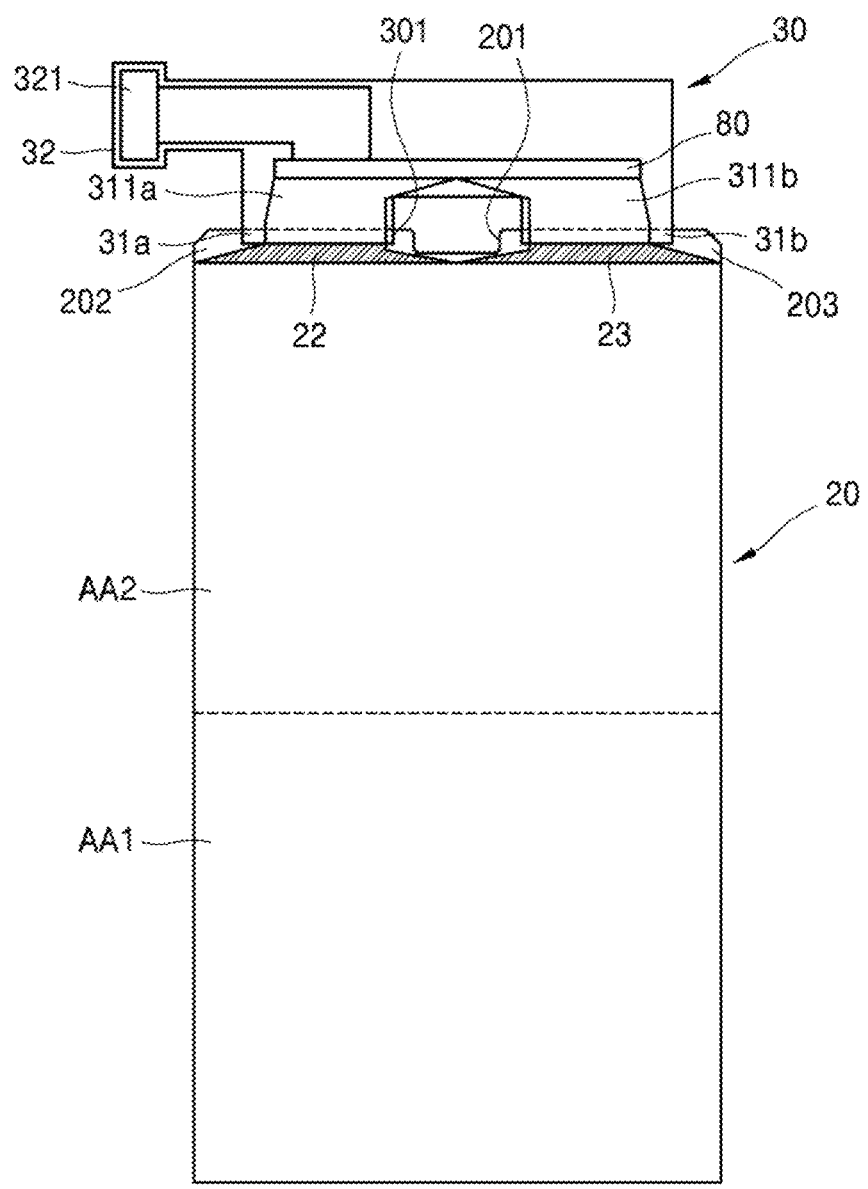

FIG. 10A illustrates a front view of an example of the flexible printed circuit 30, and FIG. 10B illustrates a development view of an example of the flexible printed circuit 30. FIGS. 11A and 11B illustrate a case in which the flexible printed circuit 30 is connected to the display module 20.

Referring to FIGS. 10A and 11A, the flexible printed circuit 30 may include first areas 31a and 31b connected to the display module 20, and a second area 32 connected to the printed circuit board 50. The first areas 31a and 31b may be connected to the pad area PA of the display module 20. The second area 32 may include a connector 321 to be connected to the printed circuit board 50.

The flexible printed circuit 30 may include a fourth inserting portion 301 into which at least some parts of the function module 60 are inserted. The fourth inserting portion 301 may be formed in a hole shape, but is not limited thereto. The fourth inserting portion 301 may also be formed in a groove shape.

The fourth inserting portion 301 may overlap with at least some parts of the first inserting portion 201 formed in the display module 20. The fourth inserting portion 301 may be disposed between the first areas 31a and 31b.

Referring to FIGS. 10B and 11B, after the first areas 31a and 31b are connected to the display module 20, the flexible printed circuit 30 may be bent to be disposed at the rear side of the display module 20.

When the flexible printed circuit 30 is bent, the fourth inserting portion 301 may be bent. As illustrated in FIG. 11A, some parts of the function module 60 may be inserted into the bent fourth inserting portion 301 and the first inserting portion 201 formed in the display module 20. In this regard, a thickness by which the function module 60 is inserted into the first inserting portion 201 and the bent fourth inserting portion 301 out of the whole thickness D may not affect an increase in a thickness of the electronic device 1.

A display driver 80 may be disposed in the flexible printed circuit 30. Thus, a material for the display module 20 may be freely selected. For example, the lower plate 220 of the display module 20 may include a plastic substrate, which is relatively weak to heat than a glass substrate, as well as a glass substrate. A material for the plastic substrate may include at least one of polyimide (PI) and polyethylene (PE).

The display driver 80 may convert a first signal received from the printed circuit board 50 into a second signal, which is a driving signal of the display module 20. The second signal may include a signal for controlling a thin film transistor formed in the display module 20, for example, at least one of a source signal and a gate signal. In some embodiments, the second signal may include 1920 gate signals and 1080*2 source signals for a pentile method. In some embodiments, the second signal may 1080*3 source signals for a RGB method.

The flexible printed circuit 30 may receive a first signal from the printed circuit board 50 via the connector 321 formed in the second area 32, and transmit a second signal converted by the display driver 80 to the display module 20.

At least two paths via which a second signal is transmitted may be formed in the flexible printed circuit 30. For example, the first and second paths 311a and 311b may be formed to be spaced apart from each other in the flexible printed circuit 30. A second signal may be transmitted to the display module 20 via the first and second paths 311a and 311b. The fourth inserting portion 301 may be disposed between the first and second paths 311a and 311b. The first and second paths 311a and 311b may be respectively formed in the first areas 31a and 31b.

Two connection areas 202 and 203 may be disposed at both sides of the first inserting portion 201. The first areas 31a and 31b of the flexible printed circuit 30 may be respectively connected to the connection areas 202 and 203 of the display module 20. In this regard, a second signal output from the display driver 80 may be transmitted to the display module 20 via the first and second paths 311a and 311b spaced apart from each other.

A second signal transmitted to the connection area 202 may be transmitted to a first active area AA1 of the display area DA via the circuit wire 22. Other second signal transmitted to the connection area 203 may be transmitted to the second active area AA2 of the display area DA via the circuit wire 23. FIGS. 11A and 11B illustrate examples in which the first active area AA1 and the second active area AA2 are disposed vertically, but the disposition of the first and second active areas AA1 and AA2 is not limited thereto.

In embodiments described herein, the display driver 80 is disposed in the flexible printed circuit 30 but is not limited thereto. The display driver 80 may be disposed in another member.

Figure 12A:
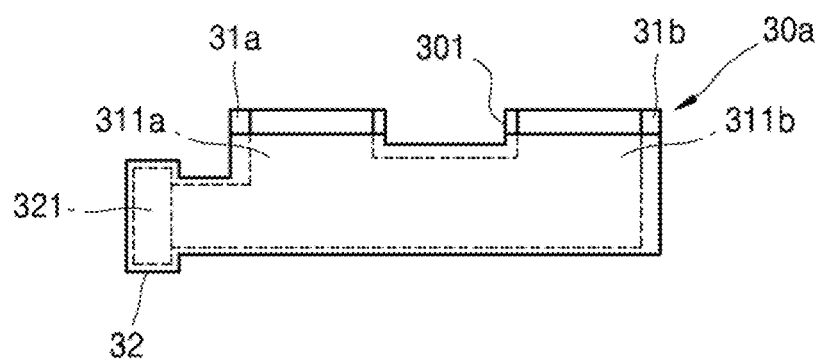
FIG. 12A illustrates a front view of another example of a flexible printed circuit according to various embodiments of the present disclosure.
Figure 12B:
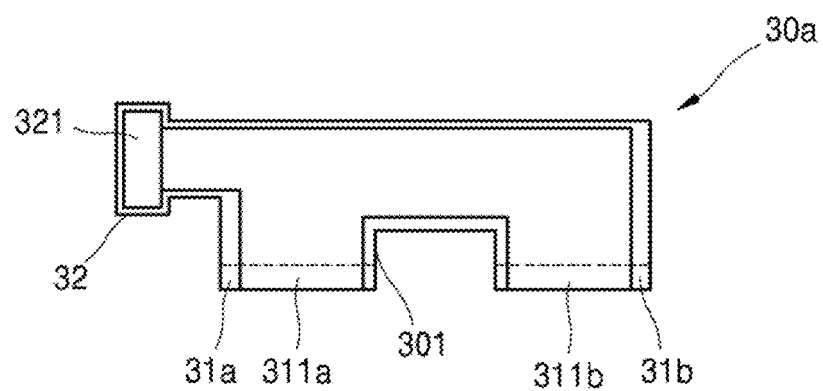
FIG. 12B illustrates a development view of the flexible printed circuit according to various embodiments of the present disclosure.
Figure 13:
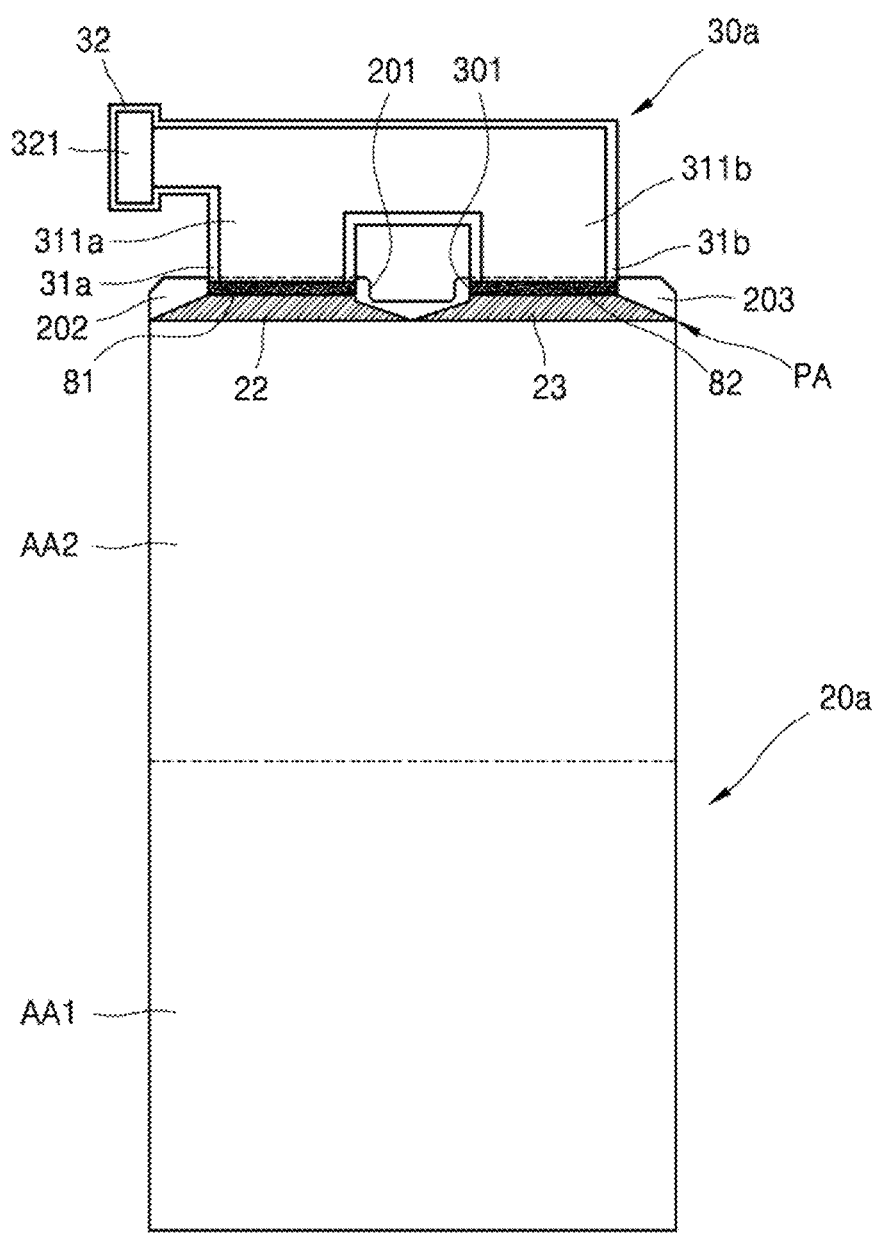
FIG. 13 illustrates a case in which a flexible printed circuit is connected to a display module according to various embodiments of the present disclosure.

Hereinafter, FIGS. 12A to 13 illustrate a case in which the display driver 80 is disposed in other member rather than the flexible printed circuit 30.

FIG. 12A illustrates a front view of another example of a flexible printed circuit 30a, and FIG. 12B illustrates a development view of the flexible printed circuit 30a. FIG. 13 illustrates a case in which the flexible printed circuit 30a is connected to a display module 20a.

Referring to FIGS. 12A to 13, a display driver may be disposed in the display module 20. For example, the display driver may be may be disposed in the pad area PA of the display module 20.

The display driver may include the first driver 81 and the second driver 82 that are spaced apart from each other. The first inserting portion 201 may be disposed between the first driver 81 and the second driver 82. The first driver 81 may be disposed in the connection area 202 and the second driver 82 may be disposed in the connection area 203.

At least two paths via which a first signal transmitted from the printed circuit board 50 is transmitted may be formed in the flexible printed circuit 30. For example, the flexible printed circuit 30 may include the first and second paths 311*a* and 311*b* that are spaced apart from each other.

The first path 311*a* may be connected to the first driver 81, and the second path 311*b* may be connected to the second driver 82. A first signal may be transmitted to the first driver 81 via the first path 311*a*, and a second signal output from the first driver 81 may be transmitted to the first active area AA1 of the display area DA via the circuit wire 22. A first signal may be transmitted to the second driver 82 via the second path 311*b*, and a second signal output from the second driver 82 may be transmitted to the second active area AA2 of the display area DA via the circuit wire 23.

A first signal may include a control signal for controlling the first and second drivers 81 and 82. For example, the control signal may include a signal for synchronizing the first and second drivers 81 and 82.

Figure 14:
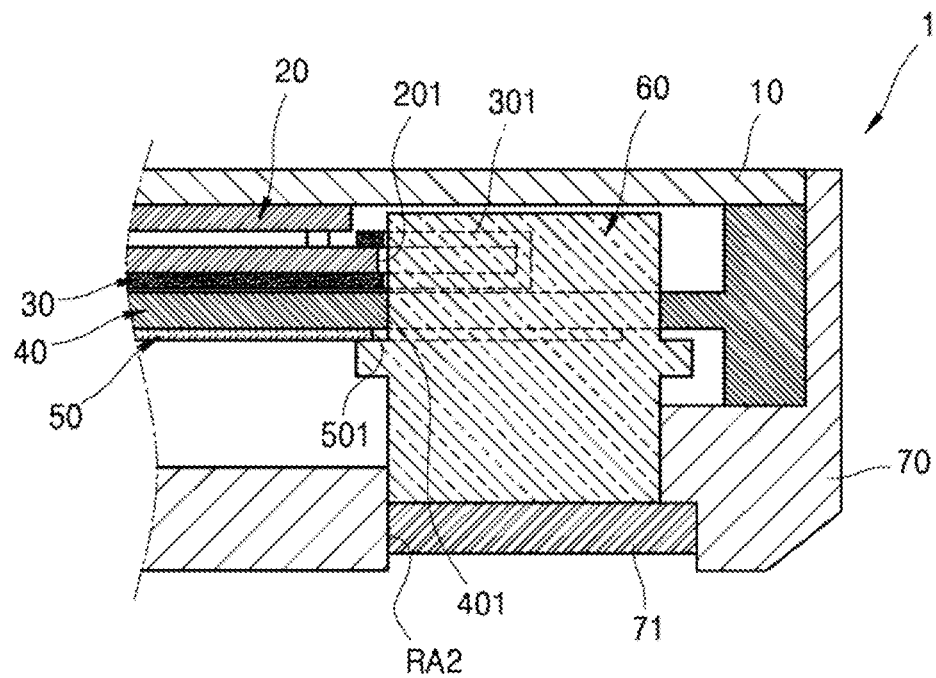
FIG. 14 illustrates a cross-sectional view showing an example of how a function module is disposed in an electronic device according to various embodiments of the present disclosure.

FIG. 14 illustrates a cross-sectional view showing an example of how the function module 60 is disposed in the electronic device 1. Referring to FIG. 14, the window 10 may be disposed in front of the housing 70. The display module 20, the flexible printed circuit 30, the frame 40, the printed circuit board 50 and the function module 60 may be disposed between the housing 70 and the window 10. A receiving area RA2 for transmitting a signal from outside to the function module 60 may be formed at the rear side of the housing 70. The receiving area RA2 may be formed in a hole shape, and the receiving area RA2 may include a transparent substrate 71, for example, a glass substrate.

The function module 60 may be inserted into the first inserting portion 201 of the display module 20, the fourth inserting portion 301 of the flexible printed circuit 30, the third inserting portion 401 of the frame 40, and the second inserting portion 501 of the printed circuit board 50. As described above, the function module 60 may be inserted into the display module 20, and the flexible printed circuit 30, the frame 40 and the printed circuit board 50 that are disposed at the rear side of the display module 20, and thus, increases in a size and a thickness of the electronic device 1 by including the function module 60 may be minimized.

In embodiments described herein, the number of the function module 60 is described as a singular, and each of the first inserting portion 201, the second inserting portion 501, the third inserting portion 401 and the fourth inserting portion 301, corresponding to the function module 60, is also described as a singular. However, the number of the function module 60 and the first to fourth inserting portions 201, 301, 401, and 501 is not limited thereto, and the number thereof may be a plural.

Figure 15:
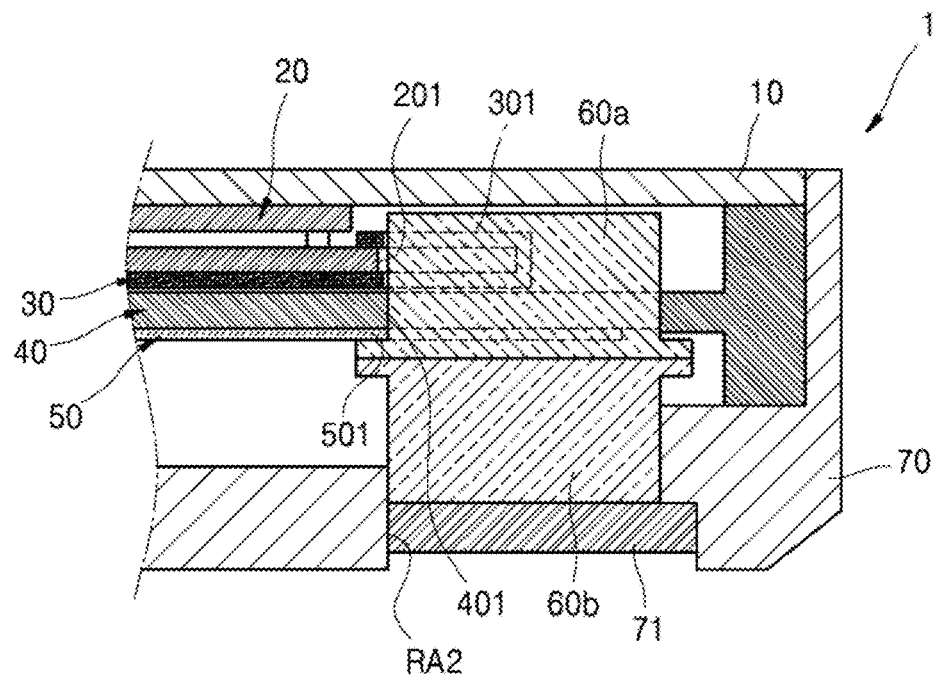
FIG. 15 illustrates a cross-sectional view showing an example of how function modules are disposed in an electronic device when the function modules are plural according to various embodiments of the present disclosure.

In some embodiments, as illustrated in FIG. 15, two function modules 60*a* and 60*b* that are disposed at a front side and a rear side may be inserted into at least one of the first inserting portion 201 and the second inserting portion 501 to the fourth inserting portion 301. For example, the function module 60*a* disposed at the front side may be a camera module, and the function module 60*b* disposed at the rear side may be a heart rate sensing module for measuring a heart rate.

Figure 16:
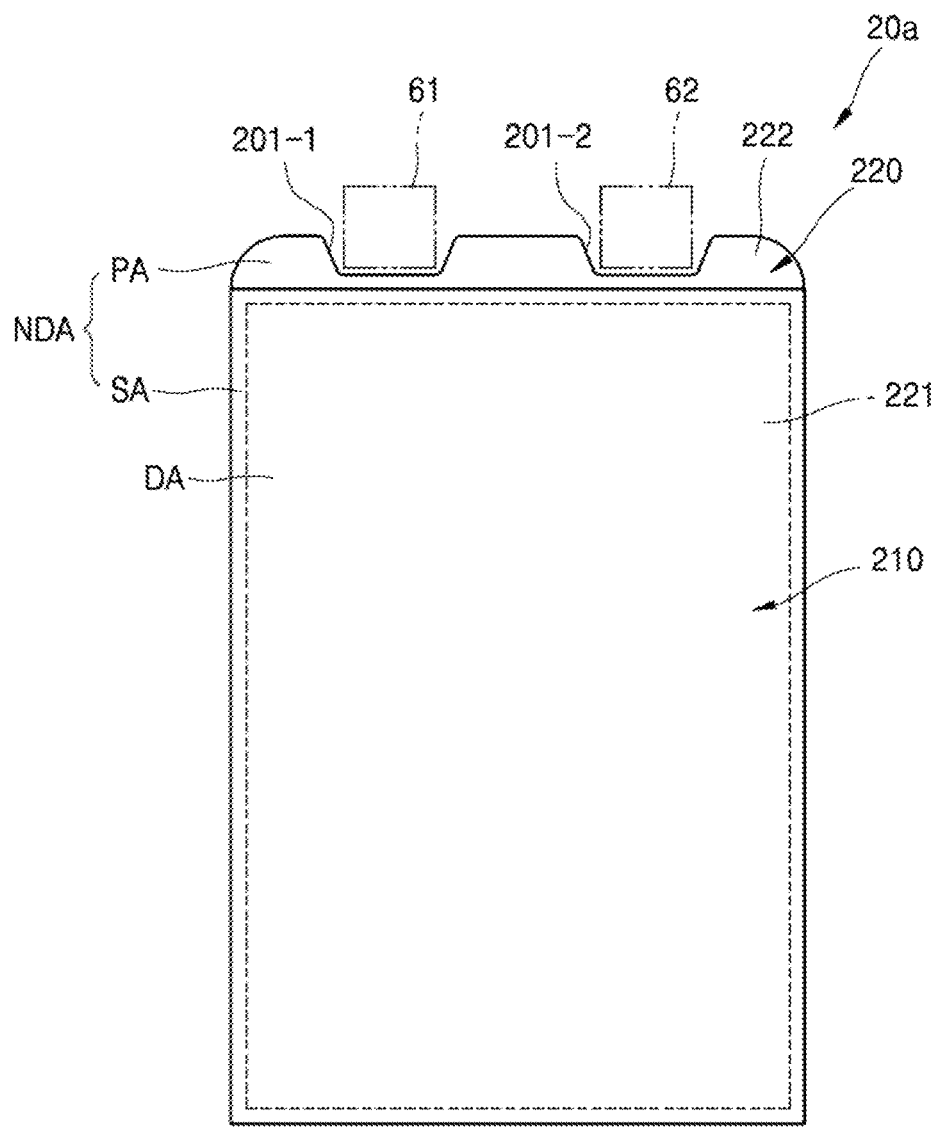
FIG. 16 illustrates a front view showing an example of how function modules are disposed in a display module when the function modules are plural according to various embodiments of the present disclosure.

In some embodiments, as illustrated in FIG. 16, two function modules 61 and 62 may be respectively disposed in first inserting portions 201-1 and 201-2 that are spaced apart from each other. For example, the two function modules 61 and 62 may be camera modules for a three-dimensional image.

As described above, in an electronic device according to an embodiment, a function module having a predetermined thickness may be inserted into an inserting portion of a display module and an inserting portion of at least one member selected from members disposed at the rear side of the display module, and thus an increase in a size and a thickness of the electronic device case by including the function module may be minimized.

To promote understanding of one or more exemplary embodiments, reference has been made to the exemplary embodiments illustrated in the drawings, and specific language has been used to describe these embodiments. However, no limitation of the scope of the inventive concept is intended by this specific language, and exemplary embodiments should be construed to encompass all exemplary embodiments that would normally occur to one of ordinary skill in the art.

The words "mechanism," "element," "means," and "configuration" are used broadly and are not limited to mechanical or physical embodiments, but can include software routines in conjunction with processors, etc.

The particular implementations shown and described herein are illustrative examples of the disclosure and are not intended to otherwise limit the scope of the disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the disclosure unless the element is specifically described as "essential" or "critical". The words used herein "including" "having" or the like are used to express an openness in terms of technology.

The use of the terms "a" and "an" and "the" and similar referents in the context of describing the inventive concept (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The inventive concept is not limited to the described order of the steps. The use of any and all examples, or exemplary language (e.g., "such as") provided herein, is intended merely to better illuminate the inventive concept and does not pose a limitation on the scope of the inventive concept unless otherwise claimed. Numerous modifications and adaptations will be readily apparent to one of ordinary skill in the art without departing from the spirit and scope.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device, comprising:
   a camera module;
   a display module including:
      first and second connection areas spaced apart from each other along an edge of the display module, and
      a first groove formed between the first and second connection areas and providing a space in which a portion of the camera module is placed;
   a printed circuit board disposed at a rear side of the display module and including one or more components for controlling the display module; and
   a flexible printed circuit connecting the display module and the printed circuit board and including:
      a first area connected to the first connection area and bent such that a portion of the first area and another portion of the first area face each other,
      a second area connected to the second connection area and bent such that a portion of the second area and another portion of the second area face each other, and
      a second groove formed adjacent to and between the bent first area and the bent second area and providing a space in which a portion of the camera module is placed.

2. The electronic device of claim 1, wherein the camera module is disposed on an upper part of the electronic device to face a front.

3. The electronic device of claim 1, further comprising a display driver configured to convert a first signal received from the printed circuit board to a second signal that is a driving signal of the display module.

4. The electronic device of claim 3, wherein a first path for transmitting the second signal to the first connection area is disposed in the first area, and a second path for transmitting the second signal to the second connection area is disposed in the second area, and
   wherein the second groove is disposed between the first path and the second path.

5. An electronic device comprising:
   a function module;
   a display module including:
      first and second connection areas spaced apart from each other along an edge of the display module, and
      a first inserting portion providing a first space where a portion of the function module is placed;
   a printed circuit board disposed on a rear side of the display module and including one or more components for controlling the display module; and
   a flexible printed circuit connecting the display module and the printed circuit board and including:
      a first area connected to the first connection area and bent such that a portion of the first area and another portion of the first area face each other,
      a second area connected to the second connection area and bent such that a portion of the second area and another portion of the second area face each other, and
      a second inserting portion disposed between the bent first area and the bent second area and providing a second space where a portion of the function module is placed,
   wherein, in the second space of the second inserting portion that is disposed between the bent first area and the bent second area, a portion of the second space overlaps with another portion of the second space, and
   wherein a portion of the function module is placed in the second inserting portion where the portion of the second space overlaps with the another portion of the second space.

6. An electronic device comprising:
   a camera module disposed on an upper part of the electronic device to face a front;
   a display module including a first plate and a second plate including an overlapped area that overlaps with the first plate and a non-overlapped area that does not overlap with the first plate, wherein the non-overlapped area includes:
      first and second connection areas spaced apart from each other along an edge of the display module, and
      a first inserting portion disposed between the first and second connection areas and providing a space in which a portion of the camera module is placed;
   a printed circuit board disposed on a rear side of the display module and including one or more components for controlling the display module; and
   a flexible printed circuit connecting the display module and the printed circuit board and including:
      a first area connected to the first connection area and bent such that a portion of the first area and another portion of the first area face each other,
      a second area connected to the second connection area and bent such that a portion of the second area and another portion of the second area face each other, and
      a second inserting portion disposed between the bent first area and the bent second area and providing a space where a portion of the camera module is placed,
   wherein, in the space of the second inserting portion that is disposed between the bent first area and the bent second area, a first portion of the space overlaps with a second portion of the space, and
   wherein the camera module is placed in the second inserting portion where the first portion of the space overlaps with the second portion of the space.

7. An electronic device comprising:
   a function module;
   a display module including:
      first and second connection areas spaced apart from each other along an edge of the display module, and
      a first groove disposed between the first and second connection areas and providing a space in which a portion of the function module is placed;
   a printed circuit board disposed on a rear side of the display module and including one or more components for controlling the display module; and
   a flexible printed circuit connecting the display module and the printed circuit board and including:

a first area connected to the first connection area and bent such that a portion of the first area and another portion of the first area face each other, a second area connected to the second connection area and bent such that a portion of the second area and another portion of the second area face each other, and a second groove disposed between the bent first area and the bent second area and providing a space where a portion of the function module is placed, wherein, in the space of the second groove that is disposed between the bent first area and the bent second area, a first portion of the space overlaps with a second portion of the space, and wherein the function module is placed in the second groove where the first portion of the space overlaps with the second portion of the space.

8. A portable communication device comprising:

a printed circuit board;

a sensor module placed in proximity of and electrically coupled to the printed circuit board;

a display module placed over and electrically coupled to the printed circuit board, the display module including a first opening portion formed therein; and a flexible printed circuit comprising a single sheet, the flexible printed circuit including a second opening portion formed in the single sheet, wherein the first opening portion provides a first space where at least one portion of the sensor module is placed and the second opening portion provides a second space where at least one portion of the sensor module is placed, and wherein the flexible printed circuit is in contact with the display module and bent toward the printed circuit board such that the second opening portion is at least partially aligned to the first opening portion and that at least one portion of the sensor module is placed in the first and second spaces in which the first and second opening portions are aligned.

9. The portable communication device of claim 8, wherein the flexible printed circuit is in contact with the display module at an upper portion of the portable communication device.

10. The portable communication device of claim 8, wherein the sensor module forms at least part of a camera of the portable communication device.

11. The portable communication device of claim 8, wherein a shape of the first opening portion is at least partially different from the shape of the second opening portion.

12. The portable communications device of claim 8, wherein a size of the first opening portion is different from the size of the second opening portion.

13. The portable communications device of claim 12, wherein a width of the first opening portion is narrower than the width of the second opening portion.

14. The portable communication device of claim 8, wherein a shape of the first opening portion at least partially conforms the shape of a portion of the sensor module that is placed in the first and second spaces.

15. The portable communication device of claim 14, wherein the shape of the second opening portion at least partially conforms the shape of the first opening portion.

16. The portable communication device of claim 8, further comprising a display driver disposed in the flexible printed circuit.

17. The portable communication device of claim 16, wherein the display driver includes a first display driver disposed in a left side of the second opening portion and a second display driver disposed in a right side of the second opening portion.

* * * * *